United States Patent
Britt, Jr.

(10) Patent No.: US 9,790,704 B2
(45) Date of Patent: *Oct. 17, 2017

(54) COMPOSITE STRUCTURAL SUPPORT ARM

(71) Applicant: POWER COMPOSITES, LLC, Leeds, AL (US)

(72) Inventor: William F. Britt, Jr., Birmingham, AL (US)

(73) Assignee: POWER COMPOSITES, LLC, Leeds, AL (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/383,545

(22) Filed: Dec. 19, 2016

(65) Prior Publication Data

US 2017/0096831 A1 Apr. 6, 2017

Related U.S. Application Data (63) Continuation of application No. 14/915,568, filed as application No. PCT/US2015/036240 on Jun. 17, 2015, now Pat. No. 9,546,498.

(Continued)

(51) Int. Cl.
| | |
|---|---|
| *E04C 3/00* | (2006.01) |
| *E04H 12/24* | (2006.01) |
| *E04B 1/30* | (2006.01) |
| *E04B 1/64* | (2006.01) |
| *B32B 1/08* | (2006.01) |

(Continued)

(52) U.S. Cl.
CPC .............. *E04H 12/24* (2013.01); *B32B 1/08* (2013.01); *B32B 27/065* (2013.01); *B32B 27/08* (2013.01); *B32B 27/304* (2013.01); *E04B 1/30* (2013.01); *E04B 1/64* (2013.01); *B32B 2262/101* (2013.01); *B32B 2266/08* (2013.01); *B32B 2307/3065* (2013.01); *B32B 2307/558* (2013.01); *B32B 2307/712* (2013.01); *B32B 2307/714* (2013.01); *B32B 2457/00* (2013.01)

(58) Field of Classification Search
CPC ..................................... E04C 3/30; E04C 3/36
USPC ............ 52/FOR. 152, FOR. 153, FOR. 154, 52/FOR. 155, 831, 832, 835, 834, 651.02; 248/218.4, 219.2
See application file for complete search history.

(56) References Cited

U.S. PATENT DOCUMENTS

| | | |
|---|---|---|
| 2,870,793 A | 1/1959 | Bailey |
| 3,531,578 A | 9/1970 | Dey |

(Continued)

FOREIGN PATENT DOCUMENTS

| | | |
|---|---|---|
| GB | 1393577 | 5/1975 |
| WO | 01/02662 A2 | 1/2001 |
| WO | 2009/049377 A1 | 4/2009 |

OTHER PUBLICATIONS

Mid South Prestress. "Hollow Core Plank." Mid South Prestress. Apr. 2, 2012 [retrieved on Aug. 26, 2015]. Retrieved from the Internet. <URL:https://web.archive.org/web/20120402020453/ http://www.midsouthprestress.com/Concrete-Products/Hollow-Core-Plank>.

*Primary Examiner* — Terrell McKinnon
*Assistant Examiner* — Michael McDuffie
(74) *Attorney, Agent, or Firm* — Bush Intellectual Property Law; Kenneth M. Bush (57) ABSTRACT

A fiber-reinforced composite structure, such as a cross arm for use in the power industry, having a rectangular outer cross-sectional shape and an inner hollow core having a curvilinear cross-sectional shape.

20 Claims, 8 Drawing Sheets

Related U.S. Application Data (60) Provisional application No. 62/013,932, filed on Jun. 18, 2014.

(51) Int. Cl.
    *B32B 27/06*     (2006.01)
    *B32B 27/08*     (2006.01)
    *B32B 27/30*     (2006.01)

(56) References Cited

U.S. PATENT DOCUMENTS

| | | | |
|---|---|---|---|
| 3,574,104 A * | 4/1971 | Medler | B29C 53/562 138/144 |
| 3,858,374 A * | 1/1975 | Ben-Zvi | E04C 3/34 52/2.11 |
| 4,262,047 A * | 4/1981 | Barnett | B29D 24/005 428/116 |
| 4,682,747 A | 7/1987 | King, Jr. et al. | |
| 4,939,002 A | 7/1990 | Hilakos | |
| 5,004,574 A | 4/1991 | Sandt | |
| 5,176,775 A | 1/1993 | Montsinger | |
| 5,228,260 A | 7/1993 | Dziedzic | |
| 5,437,899 A * | 8/1995 | Quigley | B29C 47/0016 138/123 |
| 5,471,809 A * | 12/1995 | Frankel | E04C 3/29 138/114 |
| 5,576,081 A | 11/1996 | Sandt | |
| 5,605,017 A * | 2/1997 | Fingerson | E04C 3/28 174/153 R |
| 5,800,889 A | 9/1998 | Greene | |
| 5,858,493 A | 1/1999 | Sandt | |
| 5,946,880 A | 9/1999 | Morrison, III et al. | |
| 6,058,673 A | 5/2000 | Wycech | |
| 6,155,017 A | 12/2000 | Turner | |
| 6,219,988 B1 | 4/2001 | Mahfouz et al. | |
| 6,347,488 B1 * | 2/2002 | Koye | E04H 12/24 174/146 |
| 6,367,226 B1 | 4/2002 | Shauf, Sr. et al. | |
| 6,609,345 B2 * | 8/2003 | Schauf, Sr. | E04C 3/29 428/327 |
| 6,626,406 B1 * | 9/2003 | Olson, Jr. | H02G 7/20 248/219.2 |
| 6,834,469 B2 * | 12/2004 | Fingerson | E04H 12/24 52/309.11 |
| 7,329,444 B2 * | 2/2008 | Boaz | B29C 44/1285 156/158 |
| 7,829,164 B2 | 11/2010 | Castellani et al. | |
| 8,652,629 B2 | 2/2014 | Lockhart et al. | |
| 8,713,891 B2 * | 5/2014 | Carr | E04G 23/0218 405/211.1 |
| 9,546,498 B2 * | 1/2017 | Britt, Jr. | E04H 12/24 |
| 2005/0223673 A1 * | 10/2005 | Cadwell | E04H 12/02 52/834 |
| 2007/0044424 A1 | 3/2007 | Goldsworthy et al. | |
| 2009/0319235 A1 * | 12/2009 | Lin | E04H 12/02 703/1 |
| 2011/0139503 A1 | 6/2011 | Cariaga Crespo et al. | |
| 2011/0167759 A1 * | 7/2011 | Cesternino | B32B 1/00 52/834 |
| 2012/0048613 A1 * | 3/2012 | Lockhart | E04H 12/24 174/45 R |
| 2013/0042573 A1 * | 2/2013 | Fingerson | E04H 12/02 52/834 |
| 2013/0312346 A1 * | 11/2013 | To | E04C 3/28 52/309.13 |
| 2014/0260085 A1 * | 9/2014 | Schwartau | E04C 3/36 52/847 |

* cited by examiner

Fig. 1A

PRIOR ART

Fig. 1B

PRIOR ART

PRIOR ART

COMPOSITE STRUCTURAL SUPPORT ARM

CROSS-REFERENCE TO RELATED APPLICATIONS

This application is a continuation of U.S. patent application Ser. No. 14/915,568 filed Feb. 29, 2016, which is a national stage entry of PCT Patent Application No. PCT/US2015/036240 filed Jun. 17, 2015, which claims priority to U.S. Provisional Patent Application No. 62/013,932 filed Jun. 18, 2014, the disclosures of which are incorporated herein by reference.

TECHNICAL FIELD

The present invention relates to structural devices for use in the power industry and other industries, and more particularly, to a composite structural member, cross arm, beam or other article of manufacture that can be used, for example, on power distribution poles, as a support beam for transformers, high voltage conductors, high voltage equipment supports, and racks.

BACKGROUND ART

The power industry has used wooden structural elements such as cross arms in power distribution systems for more than 100 years because wood was plentiful and inexpensive. However, in the last 15 years preservatives have been removed from wood structures due to environmental concerns and, as a result, there has been a drastic reduction in the performance and service life for wood structures. In most areas of the United States, the expected lifetime of a wood structure has been reduced to about 5-12 years. The reduced life expectancy of wood structures has resulted in increased costs for replacement. In recent years, power distribution companies have searched for alternative materials for fabrication of power poles and cross arms. Steel was considered as an alternative to wood, but increased costs for addressing safety concerns associated with electrical conductivity lead the industry away from widespread adoption of steel structures.

Composite materials have also been investigated as an alternative to wood structures. While providing distinct advantages, composite structures such as cross arms have several disadvantages in terms of cost, structural and mechanical limitations, and installation problems. For example, in order to meet structural requirements for use in various industrial applications, composite arms must be provided in a variety of rectangular shapes to accommodate different loading needs. The requirement for structural design variation of a composite arm is accompanied by a comparable requirement for a multiplicity of hardware for ancillary devices and wire attachments. In many cases the arms must be doubled to carry anticipated loads, and other components and appliances may be needed to allow the arm to be field-drilled, and to protect the arm from excessive attachment loads.

Notwithstanding the foregoing concerns, composite materials hold out several advantages over wood including corrosion resistance, strength, longer life, and the possibility for savings in installation and replacement costs.

U.S. Pat. No. 5,004,574 discloses a method of making an elongated composite structural element having fiber reinforcement using a wet pultrusion method around a rigid pipe casing. U.S. Pat. No. 5,576,081, which is a continuation-in-part of U.S. Pat. No. 5,004,574, discloses an elongated structural element having fiber reinforcement and a hollow central region. U.S. Pat. No. 5,858,493 discloses a tapered fiber-reinforced pole for supporting electric power lines.

The present invention relates to a new composite structure that exceeds the mechanical strength to weight ratio of other designs, reduces cost, and overcomes installation shortcomings of currently available composite arms. The ensuing disclosure describes certain advantages and benefits of preferred embodiments of a structure of the present invention.

DISCLOSURE OF THE INVENTION

This summary is provided merely to introduce certain concepts and not to identify any key or essential features of the claimed subject matter. The present invention provides a composite structural element or device including, but not limited to, a cross arm or beam that can be applied in a variety of industrial and non-industrial settings including, but not limited to, the power distribution industry. Design features of a structural element of the present invention were developed to overcome certain disadvantages of wood and presently available composite arms by providing a unique structural section that maximizes load capability while minimizing the size and weight of the structure.

The present invention relates in one aspect to a new composite structure that has a unique design that eliminates many of the structural weaknesses found in other composite structures such as cross arms of different shapes and/or compositions.

A structural device of the present invention provides surprisingly superior design improvements that maximize the strength-to-weight ratio leading to improved performance in the field.

Certain structural elements of the present invention provide an ultra-strong structure having dimensional parameters that can be varied to match specific load requirements without changing the outer dimensions of the structure. For example, a cross arm or other structure of the present invention maximizes efficiency of materials by increasing the cross-sectional areas where stresses are highest without adding to the external dimensions. Presently available structures are rendered stronger by increasing the external dimensions of the member, for example, by increasing the width, height, and/or length dimensions. By contrast, the present invention provides a stronger structure by adjusting the inner chamber or core dimensions without changing the external dimensions. For example, a decrease in the cross-sectional diameter of an inner core increases strength without a weight penalty that would result if the external dimensions were increased.

Certain variations of the invention described herein provide a surprisingly improved composite beam or cross arm for use in the power or other industry having certain structural and economic advantages over presently available wood and composite structures. A structure according to the present invention is structurally sound, can be economically produced, and used interchangeably as a dead end (high load) arm or a tangent (light load) arm. These features save on installation costs and reduce the need for a diverse inventory of arms, brackets, and fittings. The stronger arm of the invention also functions in either load condition, providing a safety advantage without having to double the arms for extra load conditions. Bracing is not required when a composite arm of the present invention is used with an appropriate gain plate or bracket (e.g. Britt bracket available from Britt Engineering, Leeds, Ala.).

Certain embodiments of the invention relate to an elongated composite structure, including, for example, a cross arm or beam having an exterior cross sectional geometry that is rectangular-shaped, and a hollow centrally-located inner core that has a curvilinear cross sectional geometry. A structure of the invention does not have a casing around the exterior of the structure or inner core.

In one embodiment, the present invention relates to a fiber-reinforced composite structure such as a cross arm having a wall structure whose outer or exterior surface is rectangular in cross section, and a hollow inner core having a curvilinear cross section such as circular, oval, elliptical, super-elliptical, squared circle, or squircle.

In another embodiment, the present invention relates to a composite structure, including, for example, a cross arm or beam having a rectangular outer structure and a hollow inner core which is filled with a water-repellent material to prevent moisture from entering the inner core.

In another embodiment, the present invention relates to a composite structure, including, for example, a cross arm having a rectangular outer wall structure and a hollow cylindrical inner core that is filled with a material such as closed cell foam wherein the cross arm is produced by a die/mold enabled pultrusion method.

In another embodiment, the present invention relates to a composite structure, including, for example, a cross arm or beam comprising an elongated member having a rectangular outer wall structure, a hollow inner core extending from a first end to an opposing second end of the member along its central longitudinal axis and optionally filled with a material to prevent moisture from entering the inner core, wherein the cross section of the inner core has a geometry that is curvilinear and wherein the outer wall structure has a convex exterior surface on one or more sides, preferably on all four sides.

In another embodiment, the present invention relates to a composite cross arm having a rectangular outer surface structure and a hollow inner core extending the length thereof that is filled with a water-repellant material, wherein the cross section of the inner core is curvilinear in geometry and wherein the outer structure has a convex-shaped exterior surface across the width of the section on one or more, preferably all four sides, and wherein the exterior of the structure includes a continuous layer of a fire and/or UV protectant.

In another embodiment, the present invention relates to a composite structure, for example, a cross arm or beam having a rectangular outer structure and a hollow inner core extending the length thereof that is filled with closed cell foam, wherein the cross section of the inner core is curvilinear and the outer surface is slightly convex on all four sides, the beam also including end closures or caps attached to the two opposing ends of the structure.

DETAILED DESCRIPTION OF THE INVENTION

While the following description details preferred embodiments of the present invention, and other aspects thereof, it is to be understood that the invention is not limited to the details of construction and arrangement of the parts illustrated in the accompanying drawings and description, since the invention is capable of other embodiments and of being practiced in various ways.

As used herein the terms "structure", "article", "article of manufacture" are generally interchangeable and intended to broadly cover any type of support structure or member, for example, a beam, post, pole, arm, cross arm, and the like that could be used for any purpose, for example, in the power or other industry. Unless otherwise indicated, use of one term over another should not be construed to exclude the other terms.

As used herein, the terms "core", "chamber", or "channel" are used interchangeably to refer to a hollow internal region of a structure of the invention.

As used herein, the term "casing" or "external casing" or "internal casing" or "casing member" or "mandrel" refers to a flexible or semi-flexible form, sheathing, rigid pipe, or tubing that when present resides on or around the outside and/or inside of a pultruded structural member, for example, a wet-pultruded structure. A casing or mandrel is used at least for the purpose of providing a desired mold or shape to a structure during wet-pultrusion. A casing is fabricated from any suitable material including, for example, plastic, thermoplastic, thermoset, metal, and the like, such as, but not limited to, PVC pipe. "Casing" does not include materials that may be applied to the outer surface of a structure after manufacture, for example, a fire and/or UV repellant. In this context, a structure of the present invention does not include a casing or mandrel as herein defined.

As used herein, the term "cylindrical" or "cylinder" has the ordinary meaning and generally refers to a geometrical shape having a surface traced by a straight line moving parallel to a fixed straight line and intersecting a fixed planar closed curve. These terms include cylinders whose cross section is circular, elliptical, oval, parabolic, or hyperparabolic.

As used herein the term "rectangle" or "rectangular" generally refers to the outer cross-sectional shape of a structure of the invention. The term generally has the ordinary meaning of an equiangular quadrilateral. The term "square" in which all four sides are of the same length is one type of the class of "rectangles". In some embodiments of a structure of the invention, the rectangular-shaped outer cross section includes an outer surface that is slightly convex.

As used herein the term "curved" or "curvilinear" means at least partially formed, bounded, or characterized by curved lines including, for example, a circle, squared-circle, squircle, oval, ellipse, super-ellipse, D-shape, etc. In a Cartesian coordinate system, a squircle centered on the point (a, b) with axes parallel to the coordinate axes is described by the equation:

$$(x-a)^4 + (y-b)^4 = r^4$$

Where r is the minor radius of the squircle.

Certain embodiments of a structure of the present invention have noteworthy advantages over other composite or wood devices including any one or more of the following:

Structural integrity that is retained for the full life of the structure.

Excellent corrosion resistance.

Ultra high strength to weight ratio provided in a small cross section.

Uniform cross section of certain embodiments allows use as tangent or dead end arm without regard to orientation.

Increased pin strength without the need for special plates, washers, and bolting.

Uses standard hardware eliminating the need for specialized hardware regardless of application.

Substantial cost savings over wood articles; eliminates the need for a double arm.

UV protection can be applied with expected life of about 60 years.

Environmentally safe.

Impervious to wildlife intrusion.

Shape of certain embodiments promotes shedding water for improved wet BIL.

Amenable to field drilling, including cross drilling without loss of strength.

Can be used as dead end or tangent arm using a single gain plate.

Eliminates the need for an inventory of different sizes and types of arms.

Bracing not required.

Prior attempts to maximize the strength of a cross arm have applied an outside-in design approach in which the modulus of a section is increased to match the desired rating while selecting a wall thickness to minimize the amount of material. The present invention is based on a new, inside-out design approach in which the outer dimensions of a structure remain fixed while the inner core shape and/or dimensions are changed resulting in an increase in strength while also minimizing weight.

For purposes of describing certain preferred embodiments of the invention, the forthcoming disclosure relates to a composite cross arm, for use in the power industry, but it should be understood that other structures and other uses for such articles, both within and outside the power industry, are contemplated herein and are within the scope of the invention.

A composite cross arm of the invention comprises a rectangular-shaped elongated member having a hollow inner core that is curvilinear-shaped in cross section which extends lengthwise through the elongated member from a first end to an opposing second end. The unique design of a cross arm of the invention provides stronger resistance against bending in comparison with other designs while also avoiding unstable buckling that is common to other rectangular-shaped sections. The inner core cross section may be of any curvilinear geometrical shape including, for example, circular, oval, elliptical, super-elliptical, squared-circle, squircle, etc. Preferably the hollow inner core has a circular, oval, or elliptical cross section. The inner core is preferably filled with water-repellent material such as closed cell foam or other suitable material to prevent moisture accumulation. Because the cross sectional shape of the inner core is curvilinear it can be completely filled with a water-repellent material, unlike previously known sections which have rectangular-shaped inner cross sections that leave void spaces at corner regions where moisture can accumulate thereby increasing the risk of electrical bridging or fires.

In one embodiment, a cross arm of the invention has a cylindrically-shaped inner core and a rectangular outer structural shell, which increases the torsional strength, stiffness and shear strength of the hybrid structural element. The enhanced resistance to shear provides the highest pin strength of any other similar structural element. No other known structure can provide the beam strength of the present design without large dimensional changes to the outer dimensions.

Unlike previous designs, a structure of the present invention does not contain an external or internal casing around the exterior or interior core space. In a preferred embodiment, the rectangular outer structure has a slightly convex shape across the width of the section on one or more, preferably, all four sides. A convexly-shaped side prevents water from collecting on the beam when the beam is in a horizontal position which reduces the chance of electrical shorting, bridging between pins and connections, and the possibility of fire.

The outer surface of a structure of the invention can be finished with a suitable continuous protectant layer, for example, a glass veil and/or a fire resistant vinylester resin and/or pigments. A protectant layer can be applied by any method known to the skilled artisan including but not limited to spray application of a suitable commercially available product. The outer protectant layer protects the structure from fire, UV radiation, impact, and corrosion. The protectant layer is designed to match the elongation properties of the structure under maximum load conditions so that it remains intact during the maximum operating life of the structure.

In another aspect a structure of the invention includes end closures or caps placed on the two opposing ends of the structure after closed-cell foam or other suitable water-repellant material has been inserted into the inner core. The end closures can be preformed from plastic or other suitable material and attached to the ends of the structure using structural adhesive and/or mechanical screws. The end caps protect the foam core from moisture or damage during handling and installation. End caps also serve as an environmental seal against weather and aging.

Figure 1A:
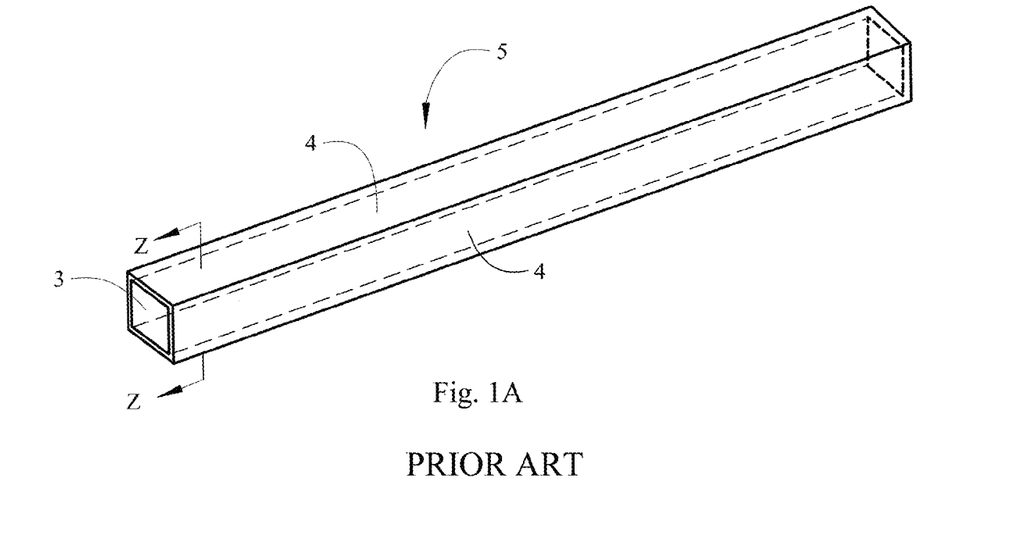
FIG. 1A shows a perspective view of a prior art cross arm.
Figure 1B:
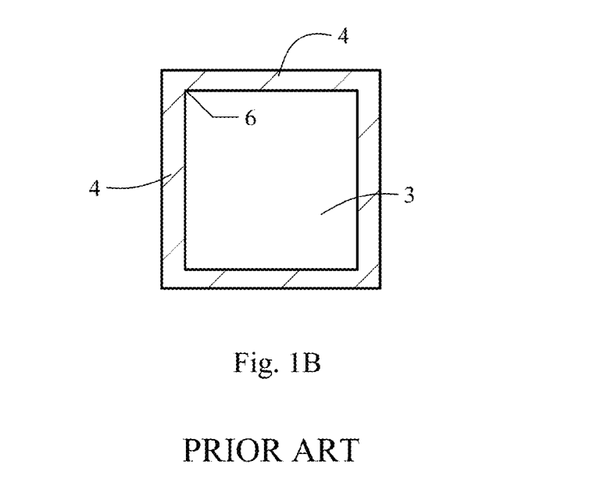
FIG. 1B shows a cross-sectional view of the cross arm of FIG. 1A showing a rectangular outer cross section and rectangular inner chamber cross section.
Figure 2A:
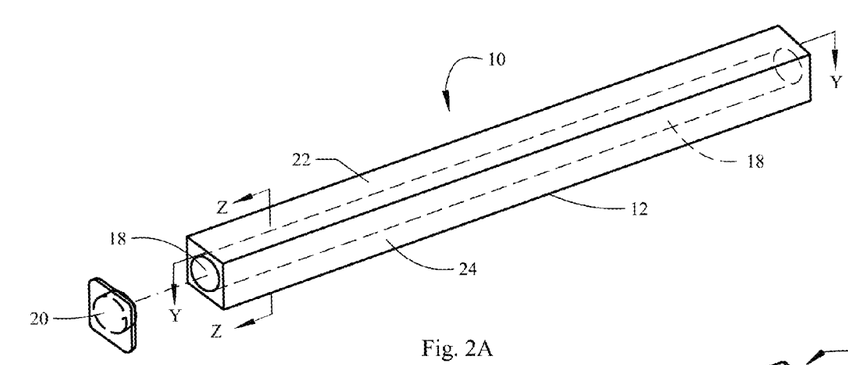
FIG. 2A shows a perspective view of an embodiment of a cross arm of the present invention.
Figure 2B:
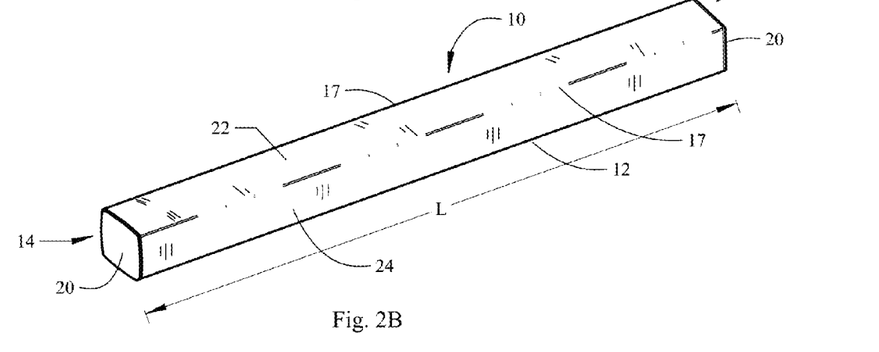
FIG. 2B shows a perspective view of a cross arm embodiment of the invention having a convex outer surface on all four sides.
Figure 2C:
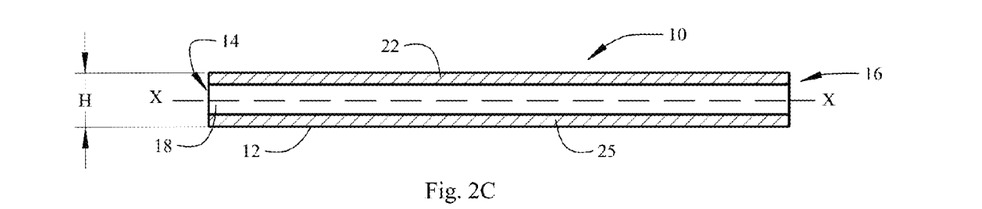
FIG. 2C provides a cross-sectional view of a cross arm of the invention having a hollow inner core.
Figure 2D:
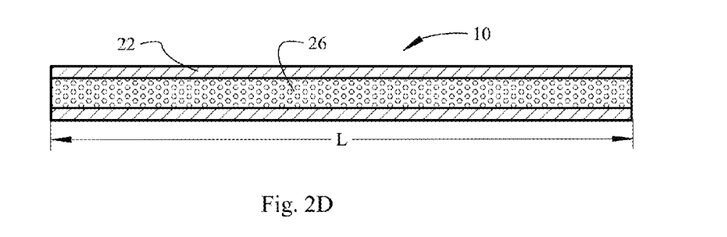
FIG. 2D provides a cross-sectional view of a cross arm of the invention in which the inner core is filled with a water-repellant material.

Referring now to the Figures, FIGS. 1A and 1B depict a prior art cross arm design 5 having four orthogonally-intersecting walls 4 which define an elongated rectangular-shaped hollow structure. FIG. 1B shows a cross section of arm 5 taken along line Z-Z in FIG. 1A. Arm 5 provides a hollow rectangular-shaped inner channel 3 defined by walls 4. Inner channel 3 includes four corners 6 that form right angles between each pair of intersecting walls.

FIGS. 2-6 illustrate aspects of preferred embodiments of a cross arm 10 of the present invention. Referring to FIGS. 2A-2D and 3A-3F, cross arm 10 includes an elongated member 12 of length L that is fabricated from composite material, preferably fiberglass-reinforced. Arm 10 has four intersecting walls, a top wall 22, two opposing side walls 24, and a bottom wall 25 that define an outer rectangular-shaped cross section along line Z-Z of FIG. 2A. Elongated member 12 includes a hollow inner chamber 18 that extends from a first end 14 to a second end 16. Chamber 18 runs parallel with a centrally-located longitudinal axis X of arm 10 (FIG. 2C; depicting cross sectional view along line Y-Y in FIG. 2A). In a preferred embodiment, chamber 18 is filled with a water-repellent material 26 such as closed-cell foam or other suitable material to prevent water accumulation inside the arm. Arm 10 preferably includes end caps 20 that are mounted to first end 14 and second end 16 by any suitable method including, but not limited to, using an adhesive or screws. The outer surface of member 12 includes four edges 17 defined by intersecting top, bottom, and side walls. It should be understood that the terms "top", "bottom" and "side" are relative terms, for example, with reference to orientation for mounting in the field.

The dimensions of the sides are equivalent when the arm has a square-shaped outer cross section; when not square-shaped, the dimensions of the top and bottom differ from the opposing pair of sides. Edges 17 may be rectangular or slightly rounded, beveled, or chamfered with a radius R (see FIG. 4). Preferably the edges are rounded with a radius of from 1/16 inch to 1/4 inch; alternatively from about 1/16 inch to about 1/8 inch.

Figure 3A:
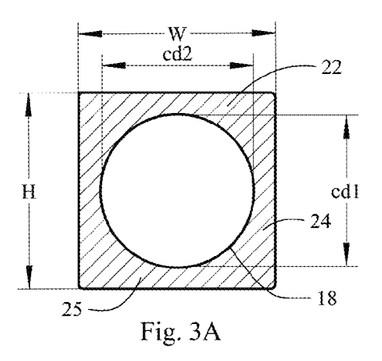
FIG. 3A provides a cross-sectional view of an embodiment of a cross arm of the invention having an outer square cross section and a hollow inner core of curvilinear cross section.
Figure 3B:
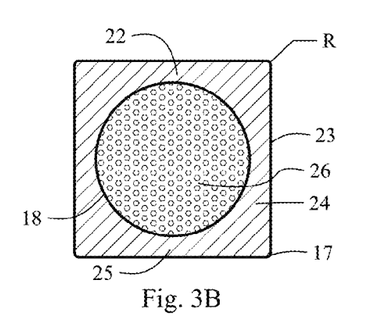
FIG. 3B shows the cross arm of FIG. 3A having a filled inner core.
Figure 3C:
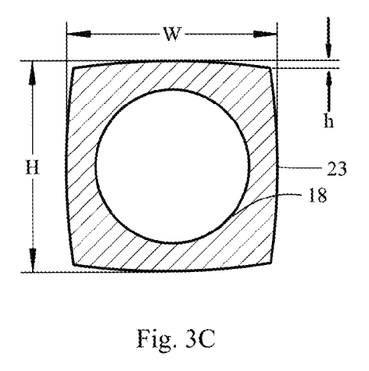
FIG. 3C shows a cross-sectional view of an embodiment of a cross arm of the invention having a square-shaped outer cross section with each side having a convex surface.
Figure 3D:
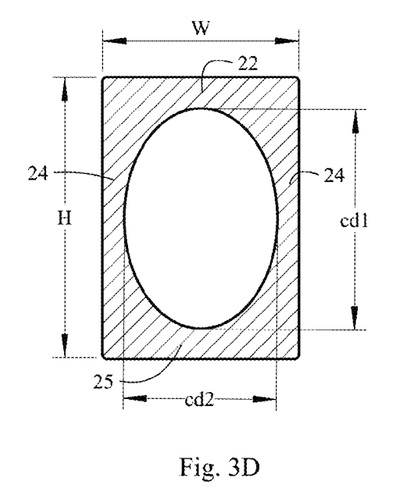
FIG. 3D shows a cross-sectional view of an embodiment of a cross arm of the invention having a rectangular outer cross section and oval-shaped inner core cross section.
Figure 3E:
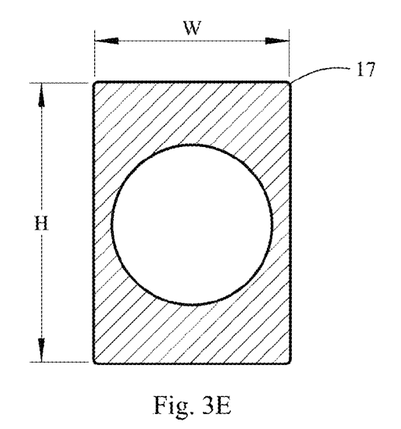
FIG. 3E provides a cross-sectional view of an embodiment of a cross arm of the invention having a rectangular outer cross section and circular inner core cross section.
Figure 3F:
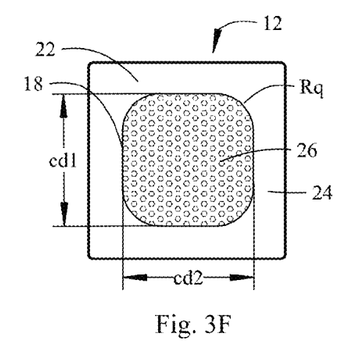
FIG. 3F provides a cross-sectional view of an embodiment of a cross arm of the invention having a square outer cross section and an inner core having a squared-circle cross section.
Figure 4:
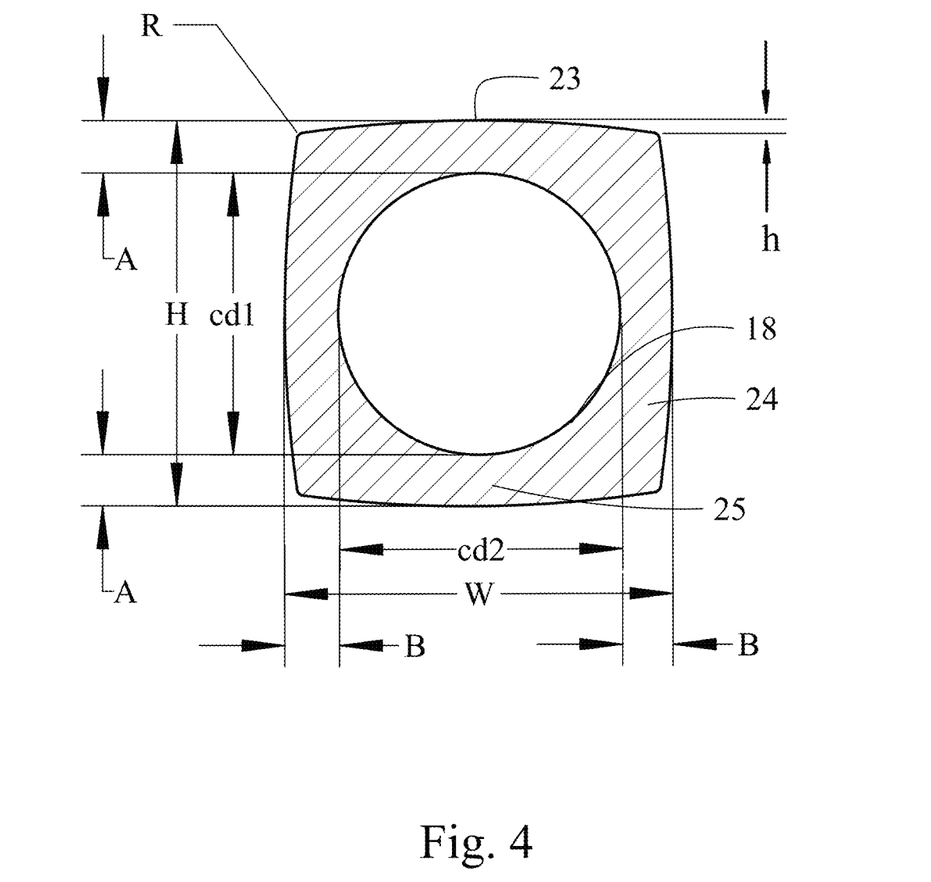
FIG. 4 provides an enlarged view of the embodiment depicted in FIG. 3C.

Referring now to FIGS. 3A-3F, cross sectional views of embodiments of elongated member 12 are shown. Member 12 has an outer rectangular-shaped cross section defined by width dimension W and height dimension H. As shown in FIGS. 3A and 3B, the outer rectangular shape may define a square in which W is equal to H. Alternatively, as depicted in FIGS. 3D and 3E, the outer rectangular shape may be other than a square such that W does not equal H, e.g. W may be larger or smaller than H. The outer surface 23 of the walls may be flat or slightly convex. In a preferred embodiment, outer surface 23 is slightly convex on one or more walls, preferably on all four walls to facilitate water drainage. As shown in FIG. 3C and FIG. 4, the degree of convexity is defined by dimension h. Dimension h is generally between 1/16 inch to 1/4 inch; alternatively between 1/16 inch to 1/8 inch; preferably about 1/16 inch, or 1/16 inch. Dimension A in FIG. 4 is in reference to the distance between the inner core boundary and outer surface 23 at the top and bottom. Dimension B refers to the distance between the inner core boundary and outer surface 23 at the sides. In preferred embodiments, the inner core 18 is centered such that the A dimension at the top and bottom are equal and the B dimension at the sides are equal. For a square-shaped structure, the A and B dimensions would be the same; for a non-square rectangle, A and B would differ.

Hollow inner chamber 18 provides a curvilinear-shaped inner core cross section defined by core dimensions cd1 and cd2. Unlike prior rectangular-shaped inner chambers, the inner cross section defined by chamber 18 does not have sharp edges or corners. The invention contemplates any curvilinear cross sectional geometry including, but not limited to, circular (FIGS. 3A, 3B, 3C and 3E), where cd1 is equal to cd2; oval, elliptical or super-elliptical (FIG. 3D), where cd1 (major axis) is larger than cd2 (small axis); or squared-rectangle (e.g. squared-circle), or squircle (FIG. 3F), in which the corners of a rectangle (e.g. square) are rounded with radius Rq. Rq can be between 0.1 to 0.5 of cd1 or cd2; alternatively from 0.2 to 0.4 of cd1 or cd2.

A cross arm of the present invention can be fabricated to any desired dimensions to meet application requirements including but not limited to standard utility cross arm dimensions. Cross-sectional dimensions are calculated using standard formulas to achieve the needed load requirements for a particular application while at the same time minimizing the weight of the arm. For example, a structure could range in length from 6 feet to 20 feet or longer; alternatively 6 feet, 7 feet, 8 feet, 9 feet, 10 feet, 11 feet, 12 feet, 13 feet, 14 feet, 15 feet, or 15 feet to 20 feet. The width W of a rectangular section can vary from 1.5 inches to 8 inches or larger; alternatively, 1.5 inches, 2 inches, 2.5 inches, 3 inches, 3.5 inches, 4 inches, 4.5 inches, 5 inches, 5.5 inches, 6 inches, 6.5 inches, 7 inches, 7.5 inches, 8 inches, 8 inches to 12 inches; or 12 inches to 15 inches. The height H of a rectangular section can vary from 1.5 inches to 8 inches or larger; alternatively, 1.5 inches, 2 inches, 2.5 inches, 3 inches, 3.5 inches, 4 inches, 4.5 inches, 5 inches, 5.5 inches, 6 inches, 6.5 inches, 7 inches, 7.5 inches, 8 inches, 8 inches to 12 inches; or 12 inches to 15 inches. Diameter dimensions of the inner core will depend on optimum design to match the load rating; in general the diameter dimensions will vary from 2 inches to 8 inches; alternatively from 2 inches to 6 inches; alternatively from 2 inches to 4 inches.

Exemplary but non-limiting dimensions for a cross arm according to the invention are provided in Table 1.

TABLE 1

Exemplary cross arm dimensions

| Dimension[1] | Example 1 | Example 2 | Example 3 |
| --- | --- | --- | --- |
| L | 6 foot | 8 foot | 10 foot |
| W | 3½ inches | 3½ inches | 3½ inches |
| H | 3½ inches | 3½ inches | 3½ inches |
| cd1 | 3⅛ inches | 2¾ inches | 2⅝ inches |
| cd2 | 3⅛ inches | 2¾ inches | 2⅝ inches |
| R | ⅛ inch | ⅛ inch | ⅛ inch |
| h | 1/16 inch | 1/16 inch | 1/16 inch |
| A | 3/16 inch | ⅜ inch | 7/16 inch |
| B | 3/16 inch | ⅜ inch | 7/16 inch |

[1]Alphanumeric dimension designations are described in the Figures and text provided herein.

Figure 5A:
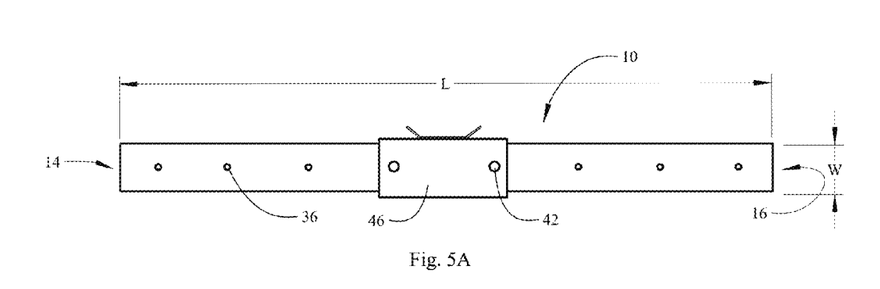
FIG. 5A is a top view of an embodiment of a cross arm of the invention attached to a mounting bracket or gain plate.
Figure 5B:
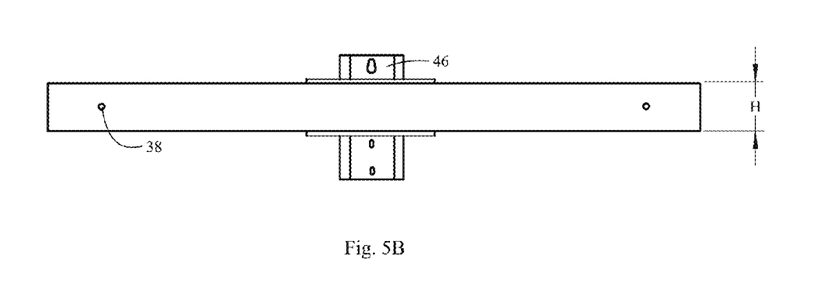
FIG. 5B is a front, elevational view of the cross arm in FIG. 5A.

As depicted in FIGS. 5A (top view) and 5B (front view), an exemplary embodiment of a cross arm of the invention has a length of 6 feet; W is 3 inches and H is 4 inches. Since the cross arm does not require spool inserts, holes 36 and 38 can be drilled through the wall portions at any location to accommodate any specifications. Holes can be of any dimension, for example, 11/16 inch to accommodate standard bolts, for example, ⅝ inch diameter bolts. The arm is mounted to a bracket or gain plate 46 with bolts 42.

Figure 6:
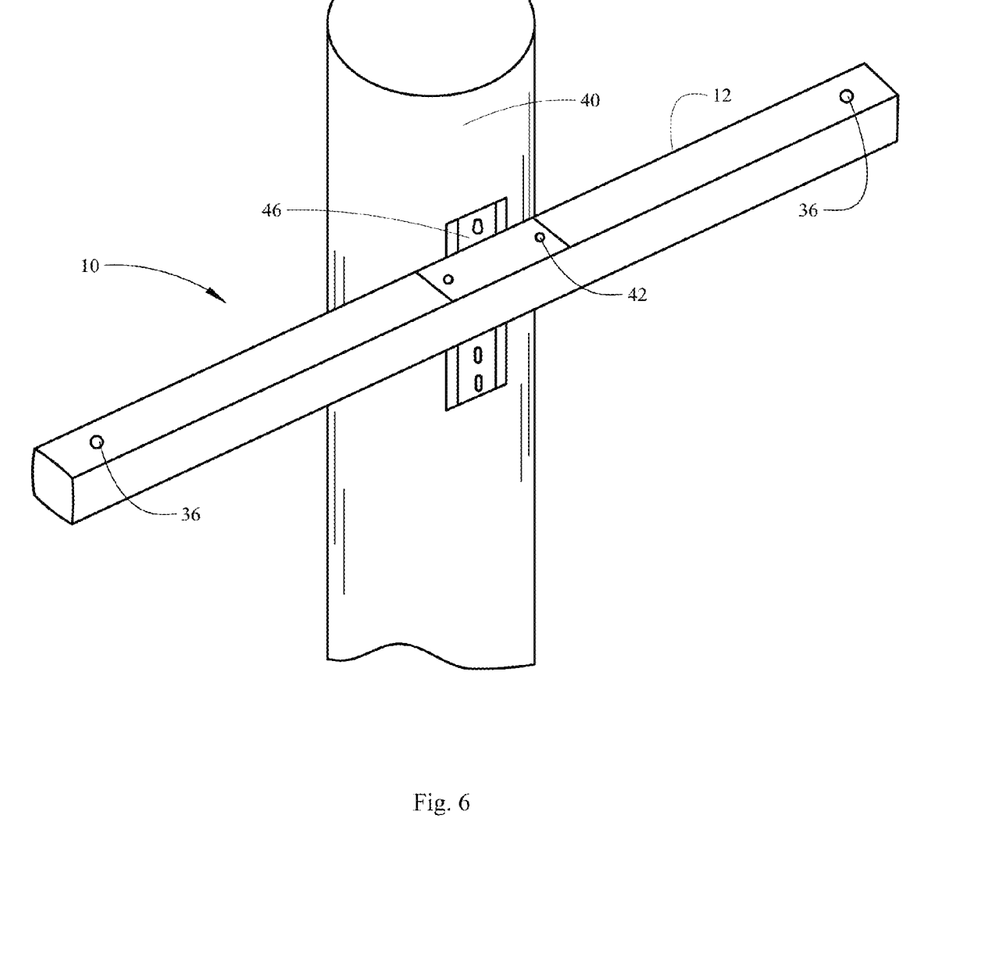
FIG. 6 is a perspective view showing a cross arm of the invention mounted to a utility pole.

Referring now to FIG. 6, in another embodiment the invention relates to a cross arm 10 of the invention in combination with a utility pole 40. The cross arm is mounted to the pole by any suitable means preferably by bolting to an appropriate bracket or gain plate 46.

In a preferred embodiment, a composite structure of the present invention is fiber-reinforced and can be made by any suitable continuous pultrusion process using, for example, a composite fabrication machine or other suitable molding apparatus, as would be known to the skilled artisan. Various pultrusion processes have been widely disclosed including, for example, in U.S. Pat. Nos. 5,004,574, 5,576,081, 5,858,493, and 4,939,002, the disclosures of which are incorporated herein by reference. In a preferred embodiment, the shape of a section or arm of the invention is formed by dies or molds in a pultrusion process for forming fiber strands in a thermosetting polymer. A structure of the invention can be made from any suitable thermosetting or thermoplastic polymer, and a reinforcing fiber material including but not limited to synthetic and/or non-synthetic strands, mats, woven and non-woven fabrics, glass and carbon fibers, etc. For example, a structure can be fabricated from unsaturated vinyl ester-, epoxy-, unsaturated polyester-, and phenol-resins as well as methacrylate resins, and polyurethane. In one embodiment, a structure of the present invention specifies a die-formed, pultruded section that provides an ultra-strong composite structural element. A pultruded section maximizes the glass content and, by forming the shape with the fiber reinforcement under tension during the curing process, the preloaded fibers increase the strength and stiffness of the section.

In another aspect the invention relates to a method for producing a composite structure of a desired length, width, and height having a rectangular outer cross section and hollow curvilinear inner core cross section by making a calculation to determine the optimum cross sectional dimensions cd1 and cd2 for the inner core to meet the desired strength and/or load requirement while minimizing the weight of the structure. Using the calculated result for the inner dimensions the structure is then fabricated to the desired specifications using a composite fabrication machine.

A structure of the present invention can be used in a number of applications including, for example, in electric power distribution systems such as use as support beams for transformers, high voltage conductors, high voltage equipment supports and racks. In a preferred embodiment for power applications the inner core is filled with a closed-cell foam or any other suitable material to eliminate moisture that might otherwise accumulate in the hollow space. Moisture inside the core could provide an electrical path for tracking, with small arcs between the conductors posing a threat for pole top fires.

A finite element analysis (FEA) was conducted on a structure of the invention to confirm structural capabilities. As illustrated in the Examples, the FEA analysis showed that a beam of the invention exceeded the design loads.

Example 1

PVC Encased Cross Arm

A beam device was manufactured by wet pultrusion of fiberglass fiber strands and resin through a square polyvinyl chloride (PVC) casing section and around a centrally-located casing pipe of PVC, as disclosed in U.S. Pat. No. 5,004,574. The wet-pultruded PVC encased device fabricated by this method achieved all structural requirements. However, centering of the inner PVC pipe was difficult to control. Additionally, the cost of manufacturing a structure according to this method and the time needed for manufacture were excessive. In addition, the quality achieved was inconsistent.

Example 2

Pultruded Beam

A study was carried out to compare and test the cross-sectional shape of the inner core of a prior art design and a design of the present invention. A pultruded square-shaped device with a square inner chamber (FIG. 7A) was manufactured and compared with a device having a design according to the present invention, i.e. rectangular outer surface and hollow curvilinear (i.e. circular) inner core (FIG. 7B). A stress evaluation test revealed interesting differences and surprising advantages of a structure fabricated according to a design of the present invention.

Background and Analysis of Test Results

Figure 7A:
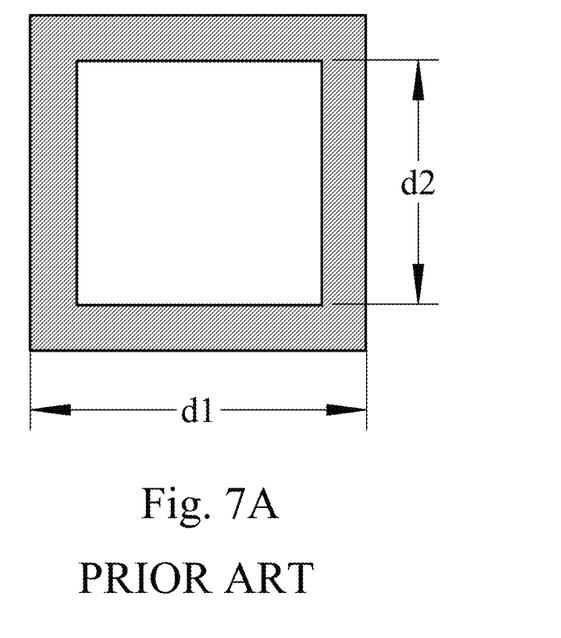
FIG. 7A is a cross sectional view of a prior art design having a square exterior shape and a square-shaped inner chamber.
Figure 7B:
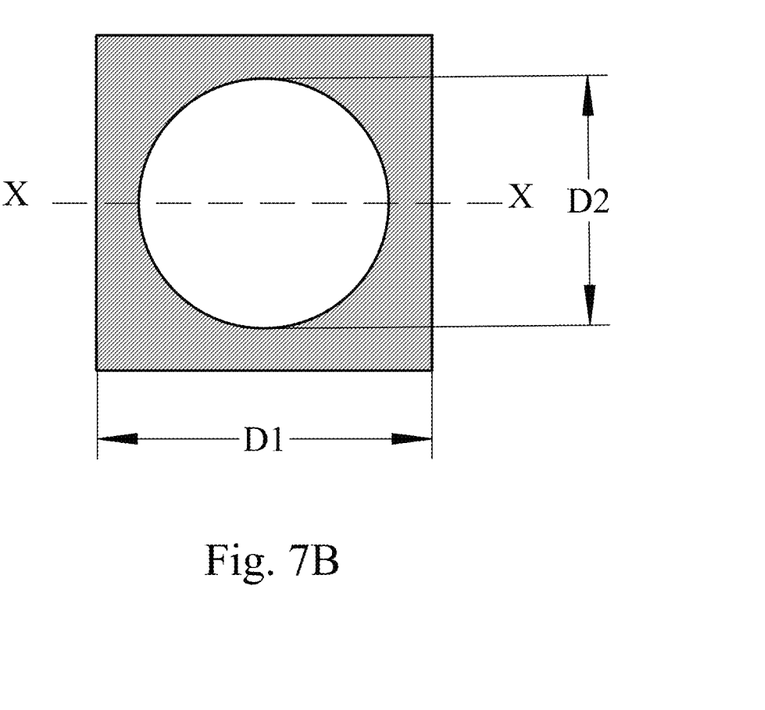
FIG. 7B is a cross sectional view of a structure having a design of the present invention featuring a square exterior shape and a circular-shaped inner core cross section.

The inertia (I) of the structure according to FIG. 7A is expressed by:

$$I_A = (d_1^4 - d_2^4)/12;$$

For $d_1 = 3.5$ in. and $d_2 = 2.75$ in, $$I_A = 7.74 \text{ in}^4$$

The area of this structure $A_A = d_1^2 - d_2^2 = 4.68 \text{ in}^2$.

The inertia (I) of a structure according to the invention as depicted in FIG. 7B is expressed by:

$$I_B = (D_1^4/12) - (\pi D_2^4/64)$$

For $D_1 = 3.5$ in. and $D_2 = 2.75$ in, $$I_B = 9.70 \text{ in}^4$$

The area of this structure $A_B = D_1^2 - \pi D_2^2/4 = 6.31 \text{ in}^2$.

$$I_A(\text{inertia } A) = 7.74 \text{ in}^4; I_B = 9.70 \ldots I_B = 25\% > I_A$$

$$A_A(\text{area } A) = 4.68 \text{ in}^2; A_B = 6.31 \text{ in}^2 \ldots A_B = 34\% > A_A$$

In order for the stiffness of the prior art design of FIG. 7A to equal the stiffness of a structure of FIG. 7B:

$$I_A = 9.70 \text{ in}^4 = (d_1^4 - d_2^4) \div 12; d_2^4 = (9.70 \times 12) - 3.5^4$$

$$d_2^4 = 33.66$$

$$d_2 = 2.41 \text{ in.}$$

$$A_B = 6.44 \text{ in}^2$$

From this calculation it is apparent that in order for the design shape of FIG. 7A to have the same stiffness (I) as FIG. 7B, the weight of the prior art structure would have to be 2% greater than the structure of FIG. 7B. Testing of a structure having the shape of FIG. 7B indicated that the round inner core offered superior structural advantage over the design of a structure of FIG. 7A.

Without intending to be bound by any particular theory, several unique design features of the present invention are believed to be important for its surprisingly superior performance. First, unlike currently available arms which are based on a single structural shape, for example, a square or circle, an article of the present invention includes a combination of shapes in which the strength of a rectangular beam is substantially increased by the inclusion of a curvilinear hollow core in the center of the rectangular shape.

Additionally, a structure of FIG. 7B showed a lower bending stress above the X centerline (FIG. 7B) as a result of increasing the cross-sectional area. For a device of FIG. 7A, the cross-section is constant until the upper section is reached. A structure of FIG. 7B accommodates the bending stress more efficiently than that of FIG. 7A. The efficiency of a structure or section according to FIG. 7B is also enhanced by the smooth transition of stress into the thicker upper section. There are no sharp changes in cross-section which would produce stress risers or intensification as in a structure of FIG. 7A.

The effectiveness of a section according to the design of FIG. 7B to resist buckling of the walls of the section is evident because of the curved inner core and increased thickness along the wall of the outer rectangular or square shape. This feature is most pronounced with a rectangular shape.

By using an inside-out design approach, the same load rating can be achieved for each arm length by decreasing the diameter of the inner core (i.e. cd1 and cd2). Alternative designs would require larger W and H dimensions to accomplish the same thing, i.e. engineering from the outside-in.

For arms that require a higher load rating W and H can be increased while maintaining a constant rating for each length by simply changing the inner core dimensions, cd1 and cd2. Non-square rectangular shapes provide even broader design options when coupled with curvilinear inner core shapes such as circular, elliptical, oval, parabolic or other.

Another advantage achieved by a design of the invention is maximum torsional strength. The curvilinear cross section (e.g. circular) used in this invention takes advantage of a circular shaped core in the center of a square or rectangular shape. The torsional load is efficiently transmitted because the inner section of the structure acts like a round tube or rod. The rectangular corners of the shape are perfectly placed and sized to add beam strength to the torsional member and stiffness to minimize bending and deflection under torsional as well as normal loads. This stiffness feature extends the service life by minimizing the detrimental effects of vibration and fatigue. Composite structures inherently are less susceptible to be damaged by fatigue because of their microscopic structure; however the advantage of the special shape of a structure of the invention is the uniform stress throughout the elements of the structure. For this reason stress concentrations are extremely low across each layer of the structure.

An analysis was performed on a 60 inch cross arm calculated to have a load rating of 20,000 pounds without breaking. Mechanical tests exceeded this loading by more than 25% in multiple tests (data not shown).

An important advantage offered by a structural member of the present invention is a pin strength (pull out rating) that exceeds the ultimate strength of the steel pins used for testing. Rated at more than 5000 pounds, this feature combined with the high beam strength allows conductor angles of over 28 degrees (versus 12 degrees with a single dead end arm) thereby providing increased reliability and safety.

As summarized in Table 2, four conditions of varying fiber percentages were analyzed to determine deflection, stress, and breaking load: (1) 50% glass by volume, (2) 64.5% glass by volume, (3) 50% glass by weight, (4) 64.5% glass by weight. The values for glass by weight are valid for this construction and were used to evaluate the mechanical properties. These values corroborated the experimental values.

TABLE 2

Test results

| Fiber Percentage | Tensile Modulus* in fiber direction (Msi) | Predicted Max Deflection (inches) | Predicted Max Principle Stress (Ksi)** | Predicted Breaking Load (lbs-force) |
| --- | --- | --- | --- | --- |
| 50% volume | 5.22 | 1.83 | 59 | 35800 |
| 64.5% volume | 6.67 | 1.45 | 60 | 44500 |
| 50% weight | 4.06 | 2.36 | 59 | 23200 |
| 64.5% weight | 4.64 | 2.06 | 59 | 31800 |

*Tensile modulus and strength are calculated based on references and Rule of Mixture.
**All max principle stresses are below material strength.

From the above analysis a square or rectangular shape with a round or elliptical core has superior beam strength over a square or rectangular shape with a square or rectangular core. The design configuration of the present invention was also found to be stronger and stiffer when compared with round sections having circular or oval cores (data not shown).

Example 3

Load Versus Deflection

Figure 8:
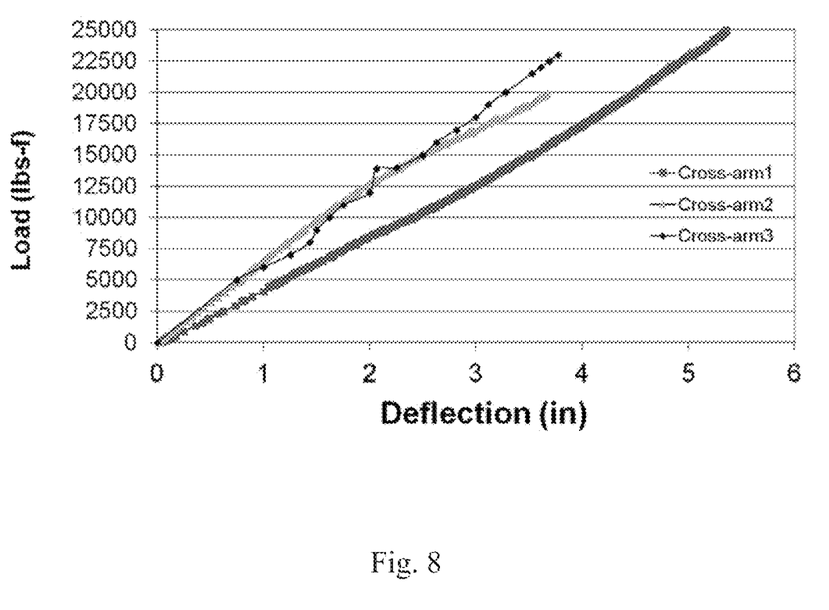
FIG. 8 is a plot showing load versus deflection of a cross arm of the invention.

Three tests were performed on an 8-foot cross arm of the invention to measure maximum load and maximum deflection. The results are shown graphically in FIG. 8 and in Table 3 below. The maximum load averages to 22,639 lbs-force.

TABLE 3

Load v. deflection

| Test arm | Max load (lbs-force) | Max Deflection (inches) |
| --- | --- | --- |
| 1 | 24927 | 5.4 |
| 2 | 19906 | 3.7 |
| 3 | 23084 | 3.8* |

*Projected deflection

Example 4

Effect of Inner Core Dimensions

To test the effect of the inner core dimensions on cross arm strength, Finite Element Analysis (FEA) was conducted on various 5-foot long cross arm designs of the invention having the same square outer cross section dimensions but with the diameter of the inner core being varied. The results, presented in Table 4, show that increasing the diameter of the inner core without changing the outer dimensions predicts an increase in maximum deflection, an increase in maximum principal stress in the middle section, and a decrease in failure load. The predicted changes were confirmed by testing (data not shown).

TABLE 4

Effect of inner core diameter on load, stress, and deflection.

| Test Arm | Diameter (inches) | Min Thickness (inches) | Area Moment of Inertia (in^4) | Area (in^2) | Predicted Max Deflection (inches) | Predicted Max Principal Stress in the middle section (Ksi) | Predicted failure load (lbs-force) |
|---|---|---|---|---|---|---|---|
| 1 | 2 5/8 | 0.437 | 8.88 | 6.30 | 2.13 | 57 | 37000 |
| 2 | 2 3/4 | 0.375 | 8.40 | 5.77 | 2.28 | 62 | 34000 |
| 3 | 2 7/8 | 0.312 | 7.86 | 5.22 | 2.47 | 66 | 32000 |
| 4 | 3 | 0.25 | 7.24 | 4.64 | 2.75 | 80 | 26000 |
| 5 | 3 1/8 | 0.188 | 6.53 | 4.04 | 3.17 | 102 | 21000 |
| 6 | 3 1/4 | 0.125 | 5.74 | 3.41 | 3.91 | 102 | 21000 |

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. It will be understood that various changes in the details, materials, and arrangements of the parts which have been described and illustrated above in order to explain the nature of this invention may be made by those skilled in the art without departing from the principle and scope of the invention as described and claimed herein.

The invention claimed is:

1. A cross arm for supporting power distribution equipment, comprising:
   an elongated support structure that provides all of the structural support of said cross arm, said support structure consisting of an outer surface, an inner surface, a first end, and an opposing second end, wherein said inner surface defines a hollow inner core that extends from said first end to said second end of said support structure, wherein said support structure is made of a monolithic fiber-reinforced composite that extends from said outer surface to said inner surface;
   wherein said support structure has a first pair of opposing sides defining a width dimension of said support structure and a second pair of opposing sides defining a height dimension of said support structure, wherein said outer surface of said support structure is rectangular in cross section;
   wherein said inner surface of said support structure defining said hollow inner core is curvilinear in cross section.

2. A cross arm according to claim 1, wherein said width dimension is smaller than said height dimension.

3. A cross arm according to claim 2, wherein said inner surface of said support structure defining said hollow inner core is elliptical in cross section.

4. A cross arm according to claim 1, wherein said width dimension is the same as said height dimension.

5. A cross arm according to claim 4, wherein said inner surface of said support structure defining said hollow inner core is circular in cross section.

6. A cross arm according to claim 1, wherein said outer surface has 4 sides, Wherein each of said sides is flat.

7. A cross arm according to claim 1, wherein said outer surface has 4 sides, wherein each of said sides is convex.

8. A cross arm according to claim 1, wherein said cross arm further comprises a protectant layer coating said outer surface.

9. A cross arm according to claim 1, wherein said cross arm further comprises a water-repellent material filling said inner core.

10. A cross arm according to claim 1, wherein said cross arm further comprises a first end cap sealing said inner core at said first end, and a second end cap sealing said inner core at said second end.

11. A utility pole for supporting power distribution equipment, comprising:
   a vertically disposed pole;
   a mounting bracket secured to said pole; and
   a horizontally disposed cross arm secured to said mounting bracket, said cross arm comprising:
      an elongated support structure that provides all of the structural support of said cross arm, said support structure consisting of an outer surface, an inner surface, a first end, and an opposing second end, wherein said inner surface defines a hollow inner core that extends from said first end to said second end of said support structure, wherein said support structure is made of a monolithic fiber-reinforced composite that extends from said outer surface to said inner surface;
      wherein said support structure has a first pair of opposing sides defining a width dimension of said support structure and a second pair of opposing sides defining a height dimension of said support structure, wherein said outer surface of said support structure is rectangular in cross section;
      wherein said inner surface of said support structure defining said hollow inner core is curvilinear in cross section.

12. A utility pole according to claim 11, wherein said width dimension is smaller than said height dimension.

13. A utility pole according to claim 12, wherein said inner surface of said support structure defining said hollow inner core is elliptical in cross section.

14. A utility pole according to claim 11, wherein said width dimension is the same as said height dimension.

15. A utility pole according to claim 14, wherein said inner surface of said support structure defining said hollow inner core is circular in cross section.

16. A utility pole according to claim 11, wherein said outer surface has 4 sides, wherein each of said sides is flat.

17. A utility pole according to claim 11, wherein said outer surface has 4 sides, wherein each of said sides is convex.

18. A utility pole according to claim 11, wherein said cross arm further comprises a protectant layer coating said outer surface.

19. A utility pole according to claim 11, wherein said cross arm further comprises a water-repellent material filling said inner core.

20. A utility pole according to claim 11, wherein said cross arm further comprises a first end cap sealing said inner core at said first end, and a second end cap sealing said inner core at said second end.

* * * * *